United States Patent [19]

Chow

[11] 4,389,825
[45] Jun. 28, 1983

[54] PRESTRESSED CONCRETE PRESSURE VESSELS WITH INCREASED PRESSURE-RETAINING CAPABILITY

[75] Inventor: Philip Y. Chow, Orinda, Calif.
[73] Assignee: T. Y. Lin International, San Francisco, Calif.
[21] Appl. No.: 182,015
[22] Filed: Aug. 28, 1980
[51] Int. Cl.³ .............................................. E04C 3/10
[52] U.S. Cl. ....................................... 52/224; 52/248
[58] Field of Search .......................... 52/224, 248, 244; 326/296

[56] References Cited

U.S. PATENT DOCUMENTS

| | | | |
|---|---|---|---|
| 3,293,139 | 12/1966 | Bellier | 52/224 X |
| 3,389,516 | 6/1968 | Ziegler | 52/224 |
| 4,195,457 | 4/1980 | Kissling et al. | 52/224 |
| 4,265,066 | 5/1981 | Lin et al. | 52/224 |

Primary Examiner—Carl D. Friedman
Attorney, Agent, or Firm—Owen, Wickersham & Erickson

[57] ABSTRACT

A prestressed concrete pressure vessel capable of containing extremely high pressures in an internal cavity, 10,000 psi and higher, is constructed in such a way as to enable the application of extremely high circumferential prestressing force at the outer cylindrical surface. The extreme circumferential post-tensioning force, much greater than previously known in prestressed concrete pressure vessels, provides for containment of extreme pressure in the internal cavity, with a relatively thin-wall vessel. In order to accommodate the high circumferential post-tensioning without structural damage at the interior of the vessel, the vessel includes vertical stress relieving slots extending radially outwardly from the internal cavity surface, effective to lower peak tangential compressive stress at the cavity surface and to relocate peak stress inside the vessel wall, where the concrete is confined.

4 Claims, 3 Drawing Figures

PRESTRESSED CONCRETE PRESSURE VESSELS WITH INCREASED PRESSURE-RETAINING CAPABILITY

BACKGROUND OF THE INVENTION

This invention relates to improvements in prestressed concrete pressure vessels (PCPV) subjected to internal pressures much higher than those normally encountered by any current PCPV, and to a method for forming the vessel. Pressures in the improved PCPV of this invention may be as high as 12,000 psi or even higher.

The PCPV of this invention may for example be used for petro-chemical and coal conversion plants. Such vessels may include hydrogen storage vessels, methanol exchange and converter vessels, and combined dissolver-separator vessels (DSV) used in coal liquefaction processes. Other applications requiring the containment of extremely high pressures are well suited for the new PCPV described herein, and thick-walled very costly steel vessels that have been required in the past can be replaced by the improved PCPV.

Since the innovative and pioneering days of PCPVs, the use of PCPVs has become established practice within the framework of codes and standards governing their use. The codes governing PCPVs serve reactor vessels representing conditions very different from those to which the present invention is directed. The governing code of practice has been the ASME Boiler and Pressure Vessel Code, Section III. Because of the nature of the vessels' application in most cases, the code on such pressure vessels is rightfully ultra-conservative. This means essentially that no tension is allowed in the concrete in the vessel wall. The concrete is required always to be in a state of compression induced thereon by circumferential prestressing in the external region of the vessel. While this requirement works well for types of pressure vessels which are subjected to internal pressures of the order of 1,000 psi, it practically puts a stop to using prestressed concrete as pressure vessel material in applications where internal pressures are much higher than 1,000 psi. E.g., coal conversion pressure vessels can be subjected to internal pressures up to 4,000 psi. Other applications, principally as test vessels, require the containment of pressures over 10,000 psi. According to conventional practice, increasing internal pressures are handled by increasing circumferential prestressing, or increasing wall thickness, or both. Limitations on how much external prestressing can be increased to cope with increasing internal pressure are imposed by the high tangential compressive stress generated by the external prestressing at the internal cavity surfaces. Also, limitations on vessel wall thickness are imposed by economic and practical considerations. These serious limitations prevent this method from solving the problems of containing high internal pressures, and a new method is therefore required.

Under conventional design practice for prestressed concrete pressure vessels, governed by codes as discussed above, stress limits for concrete under Service Levels A and B (Normal/Abnormal etc.) are zero for tensile stress, and 0.3 C $f_{cua}$ for compressive stress, where C is a stress enhancement factor due to the confinement of concrete that can vary to about 2.7 depending on the ratio of compressive stresses in the other two directions. These criteria ensure that the vessel concrete will remain predominantly in compression under operating conditions.

For a vessel similar to the DSV, if the external pressure exerted on the vessel by prestressing is held constant, an increase in the internal operating pressure would have to be matched by an increase in the wall thickness at a much faster rate, if tensile stress at the external region were to be held at zero as these conventional criteria demand. E.g., a 50% increase in internal pressure requires an increase of wall thickness by about 350%.

A more efficient way to counter increasing internal pressures would be to increase circumferential prestressing. However, this solution has been quickly limited in applicability by the high tangential compressive stresses that would be generated at the internal region of the wall, and by the congestion of prestressing steel at the exterior face.

In copending application Ser. No. 4,742, now U.S. Pat. No. 4,265,066, there was presented a new approach to the design and construction of moderately high pressure PCPVs. That system, developed from basic considerations of serviceability, behavior and safety, accepts tension and tension cracks in the outer region of the PCPV, and does not come within the purview of present codes. It provides for incorporation of artificially-introduced, preformed vertical separations at pre-determined crack locations as a method of localizing cracking and controlling high tensile stresses generated by the combined effects of internal temperature and pressure. A vessel formed according to the principles of that disclosure accepts a limited degree of tension in the outer regions of the concrete wall, and cracking separation is limited essentially to the preformed slots. A study has shown that the PCPV so designed was, in the extreme case of the DSV, approximately 70% less costly than the 18 steel vessels of equivalent capacity it was intended to replace.

Serviceability requires that the structure respond to all functional requirements throughout its operating life. The behavior of the structure is concerned with the known properties and characteristics of the component materials, and with their performance as a whole. Safety considerations refer to the reliability and redundancy of a system that are commensurate with the purpose, importance, and failure consequences of the structure. The cracked PCPV design is not less safe than an uncracked PCPV designed according the conventional codes.

Tensile stresses in a high-pressure PCPV are practically unavoidable. A more realistic assessment of tensile stresses in the strucutre is not whether cracking should be permitted, but whether such cracking will diminish the serviceability, behavior and safety of the structure for which it is designed. For a high-pressure PCPV with wall thickness of 15 ft. or more, the occurence of vertical tensile cracks extending radially from the outer surface to a depth that is less than half the thickness of the sizeable wall, should not impair the integrity and functional adequacy of the vessel.

The concept of a cracked high-pressure PCPV was developed on these considerations. To ensure that the radial cracks do not penetrate into the wall to more than half the thickness, the allowable tensile stress in the concrete in elastic analysis has been arbitrarily set at 0.6 $f_{cua}$, of the same order of magnitude as confined state stresses allowed by the existing code for vessels.

Although the PCPV of the copending application has been successful and accepted, there is now need for a PCPV capable of containing ultra-high pressures, often well over 10,000 psi. Such pressures are encountered in certain applications, for example ocean simulators, hydrogen storage vessels, methanol conversion vessels, crystal growing vessels, urethane reactor vessels and similar reactor vessels used in some petroleum and chemical processing. The high pressures in these applications are not necessarily accompanied by high internal temperatures. They are in this way different from the moderately high pressures, e.g. 2000–4000 psi, for which the PCPV of the copending application, with outer stress relieving slots, was primarily directed. In those applications, the combined and additive effects of high internal temperature and pressure make tension at and adjacent to the outer surface the critical factor. The prestressed concrete DSV, for example, having internal cavities for a dissolver reactor and for a flash drum separator, contains internal operating pressures and temperatures which may be over 2000 psi and 850° F. For the previously disclosed PCPV with outer stress-relieving slots, the DSV is an ideal application. On the other hand, where there is high internal pressure not accompanied by high temperature, the critical stress region may be the internal region, due to excessive tangential compression. In this case the vessel may be beneficially formed according to the principles of the present invention.

The present invention provides a revolutionary new application of the above-described principles of crack acceptance and design in accordance with serviceability, behavior and safety, to the design and construction of an ultra-high pressure PCPV, wherein tangential compressive stress at the internal cavity wall is the critical factor, rather than tension stress at the outer surface. Internal compressive stress is critical because of the extra high post-tensioning force that must be applied at the outside surface to contain the very high internal pressure, often well over 10,000 psi. As will be explained below, the PCPV of the present invention provides for the containment of these extremely high pressures with relatively thin walls, and with a great deal less cost than required for steel vessels of comparable capacity.

SUMMARY OF THE INVENTION

In accordance with the present invention, circumferential compressive stresses are relieved on the inside surface of a prestressed concrete pressure vessel. These stresses become excessive and critical as internal design pressures rise to new, much-higher limits requiring correspondingly higher external circumferential prestressing. It should be emphasized that the critical compressive stresses with which this invention is concerned are tangential compressive stresses, induced by circumferential prestressing, rather than radial or longitudinal stresses.

The required prestressing at the external surface of the relatively thin-walled PCPV reaches previously unknown magnitudes, rising much more rapidly than does the internal design pressure. The effect is that tangential compressive stress at the surface of the internal cavity or cavities, as the constructed vessel is post-tensioned, and without any balancing effect of internal cavity pressure, becomes impermissibly high and can lead to failure of the concrete at and near the internal cavity surfaces. The concrete is unconfined or substantially unconfined at these locations, and circumferential compression stresses due to external post-tensioning are actually highest toward the inside of the vessel, reaching peak magnitude at the internal cavity surfaces. Consequently, the concrete in unconfined state can yield under the crushing compressive stress, with resulting structural damage.

According to the invention, internal stress relieving slots are formed adjacent to the internal cavity wall of a high-pressure PCPV, oriented generally vertically and radially with respect to the internal cavity. The internal slots do not serve the purpose of simulating tension cracks, as in the referenced copending application, but instead serve the dual purpose of relieving peak compressive stresses at the interior surface due to external circumferential prestressing, and of moving these peak stresses to somewhere inside the wall. There are several important advantages to this relocation of peak stresses: (1) The concrete stresses at the surfaces are relieved and lowered to a point that is within the allowable limit, and (2) the peak stresses inside the vessel are located in confined areas, where stress enhancement of the concrete can take place. It is a known phenomenon that concrete strength increases when the concrete is confined. The amount of enhancement depends on the confining pressure, and can be several times the normally allowable stress.

It is necessary to keep internal cavity pressure out of the internal stress relieving slots. To this end, the slots are covered and sealed at the inner surface, over their entire length.

With peak stresses relieved at the internal cavity surfaces and moved to interior wall locations by the internal slot system, very much higher post-tensioning is attainable at the exterior surface without exceeding practical compressive stress limits anywhere in the vessel structure. Previously, high-pressure prestressed concrete vessels have not normally been considered as having the capability to contain pressure beyond about 4000 psi. By means of the method and structure of this invention, it is possible to use prestressed concrete for pressure vessels subjected to much higher pressure, 10,000 psi and higher.

Accordingly, a prestressed concrete pressure vessel of the invention comprises a concrete structure having an outer encompassing surface and a body, with the body being shaped to provide internal cavity means for holding a fluid under pressure and conduits providing ingress and egress for the cavity means. At the outer surface of the body are series of circumferential annular horizontal tendons for circumferentially post-tensioning the body. Also included are series of generally vertical tendons, including tendons positioned around the cavity means, and post-tensioning means are provided for each horizontal and vertical tendon. The body includes stress relieivng means in inner portions of the body adjacent to surfaces of the cavity means, for relieving compressive stresses due to external post-tensioning inside the concrete wall so that external post-tensioning can be of very high magnitude without causing stresses to exceed practical limits.

At the internal surfaces, the stress relieving means preferably takes the form of series of angularly spaced preformed partings extending from the surface into the concrete wall. These preformed partings are effective to accept some contraction due to high compressive stresses, thereby lowering the stresses at all surfaces and moving peak stresses into confined areas of the concrete where stress enhancement occurs.

It is therefore among the objects of the invention to provide a prestressed concrete pressure vessel particularly for ultra-high pressure applications such as certain petroleum chemical processes where very high pressures must be contained and where concrete vessels ordinarily are not acceptable. The vessel's ability to accept high external post-tensioning is enhanced by the use of preformed partings at internal vessel surfaces, for relieving stresses and locating peak stresses within confined areas of the concrete. These and other objects, advantages and features of the invention will be apparent from the following description of a preferred embodiment, taken in connection with the accompanying drawings.

DESCRIPTION OF A PREFERRED EMBODIMENT

Figure 1:
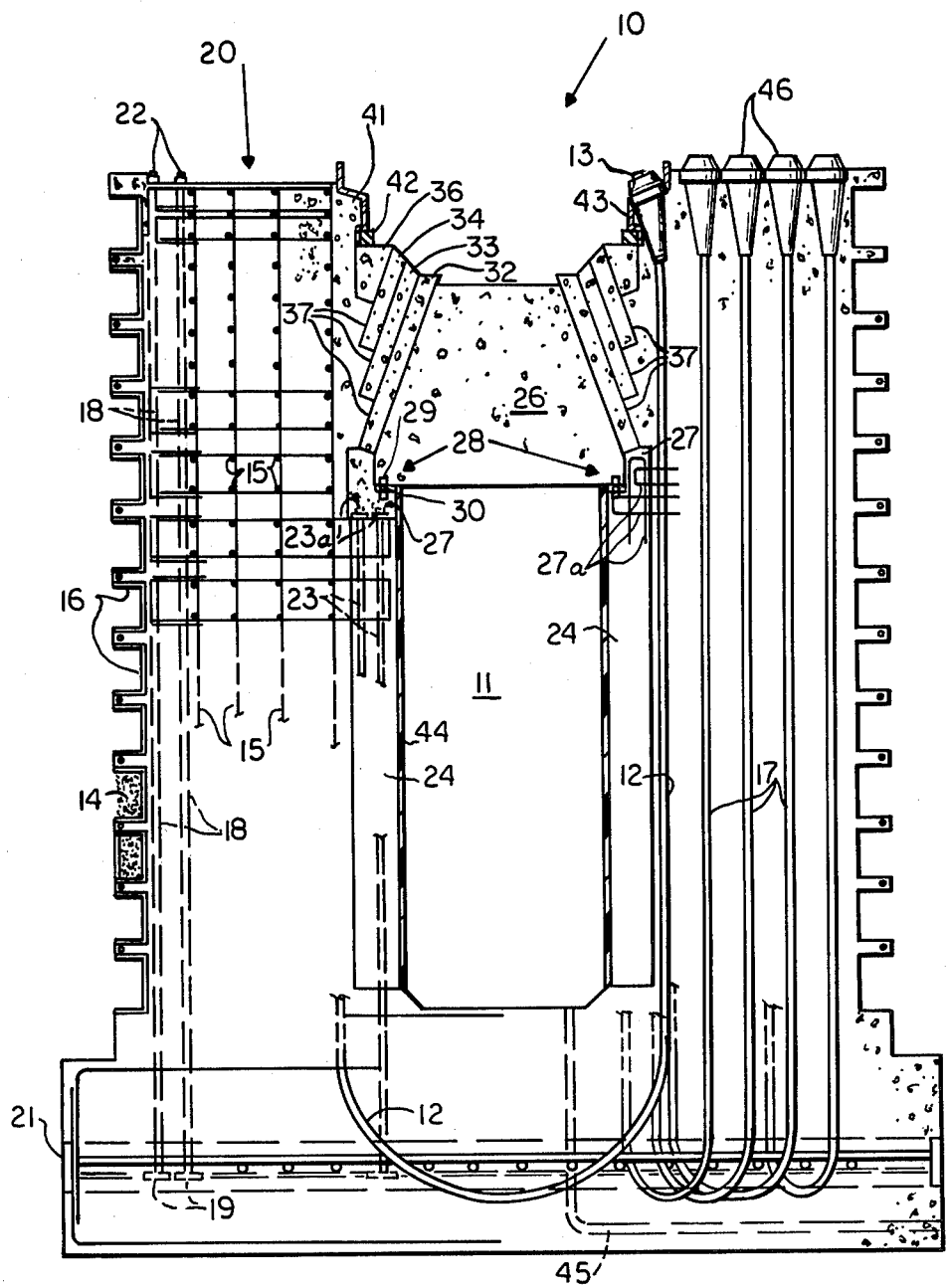
FIG. 1 is a sectional elevation view showing a prestressed concrete pressure vessel of one type of construction which may incorporate the features of the invention.
Figure 2:
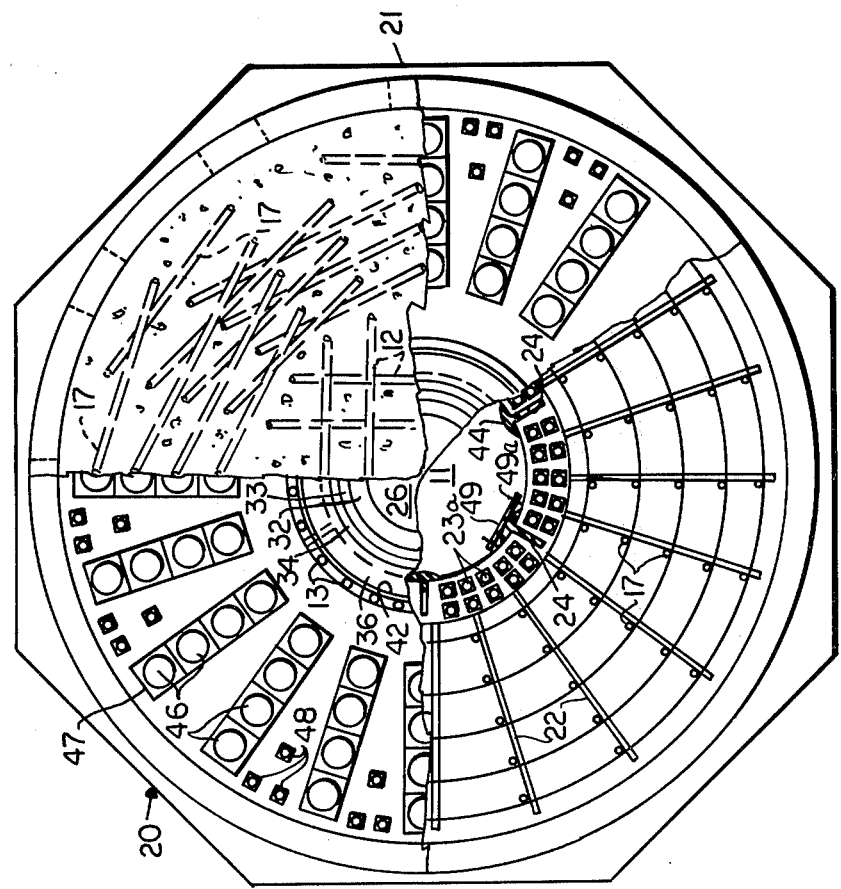
FIG. 2 is a plan view of the prestressed concrete pressure vessel of FIG. 1, with portions broken away and shown in section.

FIGS. 1 and 2 show, in sectional elevation and plan views, respectively, a prestressed concrete ultra-high pressure vessel 10 according to one preferred embodiment of the invention. The vessel is symmetrical, but different features are shown on the top sides for illustration. This particular embodiment has only a single central pressure-containing cavity 11.

The prestressed concrete pressure vessel (PCPV) shown in FIGS. 1 and 2 may be, for example, about 52 ft. high and about 35–40 ft. in outside diameter, with an inside diameter of about 10–12 ft. The vessel 10 may be designed to withstand about 12,000 psi within the internal cavity 11. The PCPV 10 includes prestressing which is for the most part somewhat typical of the prestressing used in other prestressed concrete pressure vessels, as well as reinforcing bars 15 according to typical arrangements for PCPVs. The vessel 10 also includes generally U-shaped vertical tendons 12 which extend down from the top of the vessel 10, or near the top as shown, at one side of the cavity 11, loop down and around the bottom of the cavity 11, then extend up adjacent to the other side of the cavity as indicated, so that post-tensioning anchor buttresses 13 occur only at the top of the concrete body. This general type of looped vertical tendon prestressing arrangement is disclosed in copending application Ser. No. 4,742, although in that disclosure it was not contemplated that the ultra-high pressures of the present invention could be accommodated.

The principal type of prestressing for containing that ultra-high internal pressure is circumferential post-tensioning applied by bundles of surface-wound strands or bands 14 positioned circumferentially around the vessel 10, preferably in steel channels 16 embedded in and extending around the vessel as indicated. The post-tensioning bands 14 may comprise flat steel bands, or twisted wire cable, as are well known for circumferential prestressing.

Other prestressing includes U-shaped vertical tendons 17, in addition to the central U-shaped tendons 12 around the central cavity 11, extending in spaced relationship through the height of the vessel 10 as shown. Again, the U-shaped tendons avoid the need for prestressing galleries at the bottom of the vessel, although the illustrated tendons 17 are different from the tendons 12 in that they do not surround internal cavities.

Between these prestressing tendons 17, in the outer portions of the vessel, are preferably included smaller tendons 18, shown in dashed lines. These tendons 18 have anchoring heads 19 embedded in the bottom slab 21 of the vessel, and they are post-tensioned at their upper ends 22. Shorter vertical tendons 23 may be positioned immediately circumjacent the central cavity 11 in a configuration such as the one illustrated.

In the vessel 10 of the invention, as shown in both FIGS. 1 and 2, special radially aligned vertical slots 24 are provided, extending radially outwardly from the central cavity 11. These are preformed stress relieving partings, and are effective to relieve peak stresses at the inside surface of the vessel wall 20, i.e. at the surface of the central cavity 11, and to relocate peak stress inside the concrete wall. In the embodiment illustrated, with the approximate dimensions outlined above, these preformed separations 24 may be about two feet in depth into the wall and spaced at about 60°, i.e. a total of six equally spaced slots. The width of the slots should simply be a width sufficient to adequately relieve compressive stresses at this internal region of the vessel by accommodating contraction at the slot locations. They may be, for example, about one inch wide, but tapering wider in the last two inches as they approach the surface of the cavity 11.

In the prestressed concrete pressure vessel 10 of FIGS. 1 and 2, the central cavity 11 is closed at its top by a cast concrete plug 26 which is assembled into the concrete body 10 after formation of the concrete wall. The plug rests on an annular seat 27 which also is cast after the wall 20 is formed, but cast in place, covering the post-tensioning heads 23a of the vertical tendons 23, so that post-tensioning must be completed at least in this area before the seat 27 is poured. Reinforcing bars 27a, shown on the right in FIG. 1, preferably extend from the poured wall 20 into the seat 27 to help secure it in place. A seal 28, which may be of a relatively rigid elastomeric material, is compressed between the plug 26 and the seat 27 as shown when the plug 26 is assembled into place. As indicated, the seal 28 may be generally cross-shaped, with a vertical portion 29 which extends into correspondingly formed recesses of the plug 26 and of the annular seat 27, and a horizontal portion 30 which compresses flatly between the two elements 26 and 27.

The concrete plug 26 is held in place in the concrete body over the cavity 11 by series of precast concrete slabs 32, 33, 34 and 36, as shown in FIG. 1. The slabs vary in length, the innermost slabs 32 being the longest. Each slab seats into a notch formed in the concrete wall 20, which has a sawtooth-like appearance in cross section. There are a plurality of each type of slab 32, 33, 34 or 36, preferably six or eight around the circumference of the plug 26. The plug 26 may be circular, as illustrated in FIG. 2, or it may be polygonal, with one slab 32 against each side of the plug. If the plug is circular, the inner faces of the slabs 32 are shaped as a portion of a cone; otherwise, they are planar. Following placement of the plug 26 in the vessel 10, the inner slabs 32 are first inserted, followed by the next outer slabs 33, etc., until the entire generally conically-shaped system is formed.

The slabs are locked after their placement by inserting key blocks 42 between the tops of the wedges and an annular projection 41 of the wall, and the wall may be lined in this area with a steel liner 43 which is put in place before the concrete vessel is poured. The slabs 32 engage against the top of the annular seat 27, which preferably is L-shaped as shown. It is apparent that high pressures contained in the central cavity 11 will push upwardly on the plug 26, tending to wedge the plug more tightly against the slabs 32, 33, 34 and 36, forcing them outwardly against the vessel wall. Inclined surfaces 37 of the wall 30 preclude any vertically upward movement of the slabs which the pressure generally would tend to induce, since the slabs would have to move inwardly and upwardly, rather than simply upwardly, in order to escape.

Each series of slabs 32, 33, 34 or 36 is preferably six or eight in number as discussed above. The last-installed slab of the series is divided into several narrower pieces to facilitate its assembly. The plug 26 and precast slab assembly locking arrangement have been used in other PCPVs and do not in themselves form a part of this invention.

As noted above, the inside surface of the concrete wall 15 in the illustrated embodiment is lined with a steel or other metal casting 43, and this provides a bearing against vertical movement of the key 42 as well as a bearing for the vertical prestressing tendons 12, which curve inwardly near the top of the vessel as shown and pass through the liner 43 to be post-tensioned at the exterior side of the liner.

To keep internal cavity pressure out of the stress relieving slots 24, the slots are covered and sealed by sealing members 44 (see FIGS. 1 and 2) extending through the length of each of the slots 24. The sealing members 44 may be of elastomeric material and may be generally T-shaped to intrude slightly into the slots, as illustrated in FIG. 2. Each strip of elastomeric material 44 is precompressed by an elongate, vertically oriented flat steel bar or plate 49 pulled down by stud bolts 49a embedded in the concrete on both sides of the slots and extending through the bar. The purpose of the precompression is to minimize the radial shortening of the elastomeric material as the cavity is pressurized, and to tightly seal the slots before pressurization of the cavity 11. The precompression plates 49 remain in the completed vessel.

The remainder of the inside surface of the cavity 11 can be sealed either by a liner of steel or other metal, or by non-metallic pressure barriers (not shown). For example, the concrete surface sealing may comprise impregnation with polymers followed by coating with a suitable epoxy. This is preferred, since a liner can be affected by tangential stresses under high circumferential post-tensioning.

The slots themselves are filled with materials that are stiff enough to serve as forms during concreting, and porous enough to serve as vents for pressure that may have entered the slots. Of course the materials are also compressible enough not to interfere with the slight stress movement the slots 24 will undergo.

Suitable conduits for ingress and egress of fluids to the internal cavity 11 are formed in the concrete body, as indicated for example at 45 (FIG. 1). The conduits are appropriately routed so as to avoid the prestressing tendons.

The method of forming the prestressed concrete pressure vessel 10 is similar in many respects to that of other previous constructions, such as shown in copending application Ser. No. 4,742, but there are some important differences. The interior slots or preformed partings 24 extending radially outwardly from the surface of the cavity 11 must be formed by form inserts as described above, preferably of material suitable for remaining in the slots permanently. After the concrete has set and cured to acceptable degree, the vertical tendons 23 immediately surrounding the internal cavity 11 may be post-tensioned along with post-tensioning of the remainder of the tendons 12, 14, 17 and 22, in the prescribed order for post-tensioning. Also, the slot seals 44 and precompressing plates 49 are installed, and the concrete surface sealant is applied.

The circumferential prestressing bands or strands 14 are applied at very high tension by a surface winding machine (not shown), a well-known implement which grips the vessel circumferentially by means of a friction chain. The machine is moved around the vessel's exterior while it pays out the band or wire cable under high tension. The bands or strands are anchored outside the channels 16, at anchoring buttresses (not shown) provided for them at intervals around the vessel. Multiple layers of bands or strands are required, and in the case of a 12,000 psi vessel, the layers may be built up over twelve inches thick, in the channels 16.

When post-tensioning and sealing of the internal cavity surfaces and slots have been completed, the annular seat 27 may be cast in place at the top of the vertical tendons 23 and immediately above the annulus of the preformed separations 24. All necessary sealants, including the sealing members 44 covering the slots 24, are installed in the cavity 11. The annular seal 28 is assembled into place, and the plug 26 is then positioned on the seat 27 and against the seal 28. Following this, the wedge sections 32 are assembled, and the key 42 is applied.

The partially-sectioned plan view of FIG. 2 better illustrates the arrangement of some of the prestressing tendons. Post-tensioning anchor buttresses 46 may be arranged in radially extending rows 47 as indicated, and these are for the major vertical tendons 17. As indicated in the partially broken away portion of the section of FIG. 2, anchor buttresses 46 of alternate rows 47 communicate with one another, so that the U-shaped looped vertical tendons 17 pass from one anchor buttress 46, down vertically through the concrete body, curve at the bottom and extend back up to a post-tensioning anchor buttress 46 which is two rows away. The U-shaped tendons 17 therefore overlap somewhat in their location, as indicated in the drawings. The U-shaped tendons 12 immediately surrounding the central cavity 11 may be arranged as indicated in FIG. 2, each connected to two of the anchor buttresses 13. The vertical tendons 22 are post-tensioned at anchor buttresses 48 which may be positioned as indicated in FIG. 2, in groups of three between adjacent rows of the higher-stress buttresses 46. The post-tensioning heads 23a of the tendons 23 are also shown in a broken-away portion of FIG. 2, arranged in annular rows continuous around the central cavity 11 and in groups positioned between the slots 24, for the vertical post-tensioning tendons 23.

Figure 3:
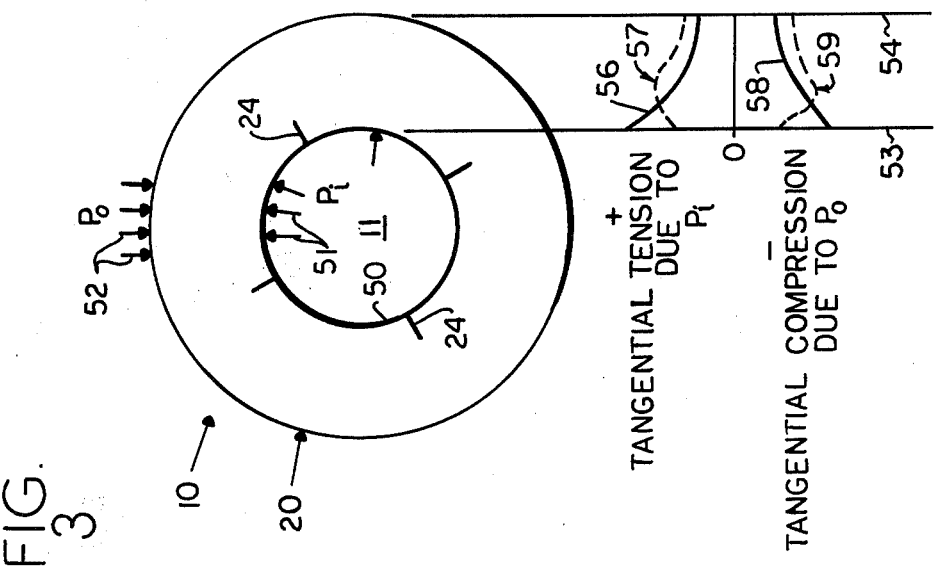
FIG. 3 is a diagrammatic representation showing a prestressed concrete pressure vessel incorporating preformed stress relieving slots at its internal surface, according to the invention, with accompanying graphs indicating stress distribution in the vessel wall with and without the stress relieving slots.

FIG. 3 shows in diagrammatic form a prestressed concrete pressure vessel 10 having preformed stress relieving slots 24 at its inside surface 50, i.e., the surface of the internal cavity 11. FIG. 3 also includes a graphic representation of stress distribution through the wall 20 of the PCPV 10. The graphs depict the effect of internal pressure $P_i$ in the internal cavity 11, represented on the upper graph; and the effect of post-tensioning of circumferential tendons (reference No. 14 in FIG. 1) at the outside surface of the vessel, indicated by arrows $P_o$, these effects being represented by the lower graph. The vertical line boundaries 53 and 54 of the graphs project directly down from the inside and outside surfaces, and represent those surfaces, respectively. Each graph shows independently the stress effect of the force under consideration alone, rather than the effect of the two forces combined. In the upper graph, which shows tension stress due to $P_i$, the solid line 56 represents the tension stressing effect of $P_i$ alone, in the case where no internal slots 24 are provided. The dashed curve 57, superimposed over the curve 56, shows the effect $P_i$ has on the concrete when the stress relieving preformed interior slots 24 are included.

In the lower graph, the solid line 58 indicates compression stress due to external post-tensioning $P_o$ in the wall, unbalanced by internal pressure, in the case where no interior slots 24 are provided. The dashed line 59 superimposed on the same graph, shows the compression stress distribution due to the same force, i.e. the external post-tensioning, where the stress relieving slots 24 are included.

As is conventional, tension stress is indicated as positive, above the zero line, with compression stress indicated as negative on the lower graph, below the zero line. In either case, the relative magnitude of the stress is indicated by the distance of the curve from the zero line.

As the upper graph of FIG. 3 illustrates, the addition of the stress relieving internal slots 24 greatly reduces peak tension stress which the concrete wall would experience when subjected to internal pressure $P_i$. In the absence of these slots 24, the graph illustrates that tension stress would peak at the interior vessel surface 50. With internal slots, the tension stress represented by the dashed curve 57 is greatly reduced at the interior surface and the peak tension stress is moved to a location inside the wall 20.

Tension stress at the internal wall 50 is not critical in the design of the high-pressure PCPV 10, because the internal cavity 11 is not intended to carry pressure until the very large outer circumferential post-tensioning force $P_o$ has been fully applied. Instead, it is the effect of this outer prestressing pressure $P_o$, applied before $P_i$, that creates a critical compressive stress situation at the interior wall 50. As shown in the lower graph by the solid-line curve 58, compression stress due to the outer post-tensioning $P_o$, without stress relieving slots 24, reaches its peak at the internal surface 50 of the vessel. As discussed above, this is an untenable situation since outer post-tensioning in the case of the ultra-high pressure PCPV of the invention is extremely high, of greater magnitude than previously known in PCPV circumferential prestressing. The circumferential force is actually magnified in effect toward the center of the cylindrical body, reaching a peak, as the graph illustrates, at the interior surface 50 of the wall. This force is not balanced by any internal pressure initially, nor can internal pressure be depended upon later, during use of the PCPV, for consistently and continuously balancing the circumferential prestressing. Consequently, structural damage would be likely to occur under the crushing compressive stress load at and near the internal surface 50 of the vessel, where the concrete is unconfined.

The dashed-line curve 59 in the compressive stress graph of FIG. 3 shows the dramatic reduction of compressive stress due to $P_o$ that can be expected at the inner surface 50 of the vessel. Not only is stress at this critical location reduced very significantly, but also, peak compressive stress is moved to a location inside the concrete wall 20, where the concrete is in a confined state and stress enhancement of the concrete occurs. These two features cooperate to enable a much larger prestressing force $P_o$ to be applied, enabling the containment of ultra-high internal pressures.

The embodiment described herein is purely illustrative of the principles of the invention, and is not intended to be limiting of the scope of the invention. Other embodiments and variations to this preferred embodiment will be apparent to those skilled in the art and may be made without departing from the essence and scope of the following claims.

We claim:

1. A very high pressure prestressed concrete pressure vessel, comprising:

a concrete structure having an outer encompassing surface and a body, with the body being shaped to provide internal cavity means for holding fluid under pressure and conduits providing ingress and egress for the cavity means, series of circumferential annular horizontal tendons at the outer surface of the body for circumferential post-tensioning of the body;

series of generally vertical tendons in the body, including tendons positioned around the cavity means;

accompanying post-tensioning means for each tendon; and stress relieving means in inner portions of the body adjacent to surfaces of the cavity means, comprising a series of angularly spaced preformed partings oriented generally vertically and extending radially outwardly into the vessel wall from the surfaces of the internal cavity means, for relieving compressive stresses at the internal cavity surfaces and for locating peak compressive stresses due to external circumferential post-tensioning inside the concrete wall so that external post-tensioning can be of very high magnitude without causing stresses to exceed practical limits, and including elastomeric sealing members at the surfaces of the internal cavity means, over the preformed partings, for keeping internal cavity pressure out of the partings, with precompressing means compressing the sealing members toward the partings.

2. The vessel of claim 1, wherein the precompressing means comprises, at each parting, an elongate steel plate, with stud bolts extending from the concrete at both sides of the parting for tightening the plate to compress the sealing member against the parting.

3. A very high pressure prestressed concrete pressure vessel, comprising:

a concrete structure having an outer encompassing surface and a body, with the body being shaped to provide internal cavity means for holding fluid under pressure and conduits providing ingress and egress for the cavity means, series of circumferential annular horizontal tendons at the outer surface of the body for circumferential post-tensioning of the body;

series of generally vertical tendons in the body;

accompanying post-tensioning means for each tendon; and stress relieving means in inner portions of the body adjacent to surfaces of the cavity means, comprising a series of angularly spaced preformed partings oriented generally vertically and extending radially outwardly into the vessel wall from the surfaces of the internal cavity means with vertical tendons positioned between the preformed partings, said partings being effective for relieving compressive stresses at the internal cavity surfaces and for locating peak compressive stresses due to external circumferential post-tensioning inside the concrete wall so that external post-tensioning can be of very high magnitude without causing stresses to exceed practical limits.

4. A very high pressure prestressed concrete pressure vessel, comprising:

a concrete structure having an outer encompassing surface and a body, with the body being shaped to provide internal cavity means for holding fluid under pressure and conduits providing ingress and egress for the cavity means, series of circumferential annular horizontal tendons at the outer surface of the body for circumferential post-tensioning of the body;

series of generally vertical tendons in the body, including tendons positioned around the cavity means, and including U-shaped tendons extending down from the top of the body adjacent to the cavity means, around the bottom of the cavity means, and up adjacent to the other side of the cavity means;

accompanying post-tensioning means for each tendon; and stress relieving means in inner portions of the body adjacent to surfaces of the cavity means, for relieving compressive stresses at the internal cavity surfaces and for locating peak compressive stresses due to external circumferential post-tensioning inside the concrete wall so that external post-tensioning can be of very high magnitude without causing stresses to exceed practical limits.

* * * * *